(12) United States Patent
Keno et al.

(10) Patent No.: US 11,534,871 B2
(45) Date of Patent: Dec. 27, 2022

(54) DISSIMILAR METAL JOINT INCLUDING FLAME-RETARDANT MAGNESIUM ALLOY LAYER

(71) Applicant: ASAHI KASEI KABUSHIKI KAISHA, Tokyo (JP)

(72) Inventors: Hiroki Keno, Tokyo (JP); Masahiko Otsuka, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 414 days.

(21) Appl. No.: 16/482,410

(22) PCT Filed: Apr. 4, 2018

(86) PCT No.: PCT/JP2018/014474
§ 371 (c)(1),
(2) Date: Jul. 31, 2019

(87) PCT Pub. No.: WO2018/190228
PCT Pub. Date: Oct. 18, 2018

(65) Prior Publication Data
US 2020/0384578 A1    Dec. 10, 2020

(30) Foreign Application Priority Data

Apr. 14, 2017    (JP) .............................. JP2017-080875

(51) Int. Cl.
*B23K 20/08*    (2006.01)
*B23K 35/28*    (2006.01)
(Continued)

(52) U.S. Cl.
CPC ............ *B23K 35/286* (2013.01); *B23K 20/08* (2013.01); *B23K 35/284* (2013.01); *B23K 2103/10* (2018.08); *B23K 2103/15* (2018.08)

(58) Field of Classification Search
None
See application file for complete search history.

(56) References Cited

U.S. PATENT DOCUMENTS 3,140,537 A * 7/1964 Popoff ................ B23K 20/085
                                                     228/108
3,614,827 A * 10/1971 Knop .................... B23K 20/08
                                                     228/107
(Continued)

FOREIGN PATENT DOCUMENTS

CN    103586574 A  *  2/2014
CN    104759749 A  *  7/2015
(Continued)

OTHER PUBLICATIONS

Chen et al., Investigation on the Explosive Welding of 1100 Al-alloy and AZ31 Magnesium alloy, Journal of Materials Engineering and Performance, vol. 25(7), Jul. 2016, p. 2635-2641 (Year: 2016).*
(Continued)

*Primary Examiner* — Devang R Patel
(74) *Attorney, Agent, or Firm* — Greenblum & Bernstein, P.L.C.

(57) ABSTRACT

Provided is a multimaterial joint material that contributes to multimaterialization and a reduction in weight of a transport apparatus, the multimaterial joint material being configured from: a flame-retardant magnesium alloy; and a metal or alloy selected from the group consisting of aluminum alloys, titanium alloys, stainless steel, and steel. This multimaterial joint material is such that two or more layers of different types of metal materials are joined, wherein the multimaterial joint material is characterized in that: of the two or more layers of metal materials, at least one layer comprises a flame-retardant magnesium alloy, and another layer comprises a metal or alloy selected from the group consisting of aluminum alloys, titanium alloys, stainless steel, and steel;
(Continued)

and the two or more layers of metal materials are joined together across the entire surface of joining surfaces that overlap each other.

6 Claims, 5 Drawing Sheets

(51) Int. Cl.
  *B23K 103/08* (2006.01)
  *B23K 103/10* (2006.01)

(56) References Cited

U.S. PATENT DOCUMENTS

| 4,925,084 | A | * | 5/1990 | Persson | B23K 20/08 |
|---|---|---|---|---|---|
|  |  |  |  |  | 228/107 |
| 5,902,498 | A | * | 5/1999 | Mistry | B01J 2/00 |
|  |  |  |  |  | 219/121.64 |

FOREIGN PATENT DOCUMENTS

| JP | 2004-195493 | 7/2004 |
| JP | 2007-15018 | 1/2007 |
| JP | 2007015018 A * | 1/2007 |
| JP | 2007-111830 | 5/2007 |
| JP | 4256152 | 4/2009 |
| JP | 4336744 | 9/2009 |
| JP | 4885204 | 2/2012 |
| JP | 5315043 | 10/2013 |
| JP | 2016-182628 | 10/2016 |
| KR | 10-2014-066413 A | 6/2014 |
| WO | 2009/107928 | 9/2009 |
| WO | 2011/155214 A1 | 12/2011 |

OTHER PUBLICATIONS

Mori et al., "Application of the Flame-resisting Mg Alloy to Body Shell", QR of RTRI, vol. 55, Nov. 2014 (Year: 2014).*

Kakimoto, "Joint Material of aluminum and stainless steel for welding", Welding International, vol. 14, issue 8, 2000, p. 614-619 (Year: 2000).*

International Preliminary Report on Patentability issued in International Patent Application No. PCT/JP2018/014474, dated Oct. 15, 2019 (with English translation).

Written Opinion of the International Searching Authority issued in International Patent Application No. PCT/JP2018/014474, dated Jun. 19, 2018 (with English translation).

International Search Report issued in International Patent Application No. PCT/JP2018/014474, dated Jun. 19, 2018 (with English translation).

KR Office Action, KR Patent Office, Patent Application No. 10-2019-7021721, dated Jun. 30, 2020.

Supplementary European Search Report, European Patent Office, Application No. 18784131.7, dated Jul. 27, 2020.

* cited by examiner

DISSIMILAR METAL JOINT INCLUDING FLAME-RETARDANT MAGNESIUM ALLOY LAYER

FIELD

The present invention relates to a dissimilar metal joint in which two or more layers of different types of metal materials are joined, wherein at least one layer is composed of a magnesium alloy having flame retardation.

BACKGROUND

There is a growing demand for lightweight materials for use in transport equipment such as aircraft, railway cars or automobiles in an attempt to reduce fuel consumption by reducing weight. There is a particularly strong demand for multimaterialization in which suitable lightweight materials are used at suitable locations corresponding to the characteristics of each material.

Among such lightweight materials, magnesium is expected to be used as a transport equipment structure based on its light weight. In particular, flame-retardant magnesium alloys are alloys in which flame retardation of the magnesium alloy has been improved by the addition of calcium, for example, and are expected to be used as a structure for railway cars and the like.

In the case of joining with different types of metal materials by welding and the like, it is difficult to impart adequate strength to magnesium when joining due to differences in physical properties and the generation of brittle intermetallic compounds. Consequently, research is being conducted and practical applications are being developed for the joining of flame-retardant magnesium by solid phase bonding such as friction stir welding that does not involve melting.

However, in the case of joining magnesium with different types of metal materials, due to differences in optimum joining conditions attributable to differences in physical properties, there are numerous problems such as the occurrence of defects in the joints which causes inadequate strength, differences in joint structure attributable to the direction of tool rotation and the direction of tool movement of the friction stir device, and limitations on the allowable plate thickness for joining.

In particular, flame-retardant magnesium alloys have low values for elongation despite having high strength, are more susceptible to the formation of cracks in the material than typical magnesium alloys, and in order to process these alloys while maintaining strength, it is necessary to join these alloys under more suitable conditions. This raises the degree of difficulty of joining flame-retardant magnesium alloys with different types of metal materials.

The following PTL1 describes a friction stir welding method between flame-retardant magnesium alloy and the same type and different types of metal. Although PTL1 describes that a magnesium thin plate is inserted into the joint and friction stir welding is carried out to inhibit decreases in strength and thermal deformation, there are no descriptions whatsoever regarding the shear strength of the joint or the form of the joint when the contact surfaces of different types of metal materials are joined over their entire surface.

The following PTL2 describes a jointing material in which an aluminum alloy, titanium alloy or stainless steel and magnesium are overlapped. Although PTL2 discloses a jointing material in which different types of metals are joined by solid phase bonding in a second embodiment thereof, there are no descriptions whatsoever regarding joining strength with a transition metal in the vicinity of the joining interface.

The following PTL3 discloses a method for producing a magnesium alloy cladding material. Although PTL3 discloses a method for producing a magnesium cladding material by rolling, there are no descriptions regarding magnesium having flame retardation, and there are also no descriptions regarding the joining strength of the cladding material.

The following PTL4 describes a method for joining magnesium alloy with a different type of metal by colliding metal plates at high speed. Although PTL4 describes the production of magnesium cladding by a method such as explosive welding there are no examples regarding magnesium alloy having flame retardation and there are no descriptions regarding joining strength.

The following PTL5 describes jointing material of different types of metals, a method for producing the same, and the structure of a transport means. PTL5 discloses a method for joining by means of an adhesive layer and a method for directly joining different types of metals by solid phase bonding in which the materials are heated after applying pressure, and in this case, the materials are thought to undergo a transformation due to heating. In addition, PTL5 does not contain a description regarding joining strength.

The following PTL6 describes friction stir welding of a magnesium alloy material and iron-based material. PTL6 describes that tensile strength comparable to the base material tensile strength of pure magnesium can be demonstrated by inserting a magnesium alloy containing aluminum, aluminum thin plate, aluminum powder and thin silver plate between magnesium and low-carbon steel and then performing friction stir welding. However, there are no examples of flame-retardant magnesium alloy for which elongation, strength and other physical properties differ greatly from pure magnesium, and there are no descriptions regarding application as a joint of a joined body.

CITATION LIST

Patent Literature

PTL1: Japanese Patent No. 4336744
PTL2: Japanese Patent No. 4256152
PTL3: Japanese Patent No. 5315043
PTL4: Japanese Unexamined Patent Publication No. 2007-15018
PTL5: Japanese Patent No. 4885204
PTL6: Japanese Unexamined Patent Publication No. 2016-182628

SUMMARY

Technical Problem

With the foregoing in view, an object of the present invention is to provide a dissimilar metal joint having strength that enables a flame-retardant magnesium alloy, for which joining with a different type of metal is difficult, to be used as a transport equipment structure.

Solution to Problem

As a result of conducting extensive studies and experiments to solve the aforementioned problem, the inventors of the present invention succeeded in fabricating a dissimilar metal joint in which a flame-retardant magnesium alloy is directly joined surface to surface, and found that the resulting dissimilar metal joint has adequate strength enabling application to transport equipment, thereby leading to completion of the present invention.

Namely, the present invention is as described below.

[1] A dissimilar metal joint for a transport equipment structure in which two or more layers of different types of metal materials are joined, wherein at least one layer of the two or more layers of metal materials is composed of a flame-retardant magnesium alloy, another layer is composed of a metal or alloy selected from the group consisting of aluminum alloy, titanium alloy, stainless steel and steel, and the two or more layers of metal materials are mutually joined over the entire joining surfaces that respectively overlap.

[2] The dissimilar metal joint described in [1] above, wherein the joining surfaces are such that the two or more layers of metal materials are mutually joined directly by solid phase bonding without having an adhesive layer interposed there between, and the thickness of a transition layer formed due to plastic flow and/or heat at the joining interface is 300 μm or less.

[3] The dissimilar metal joint described in [1] or [2] above, wherein the shear strength at the joining interface is 70% or more of the shear strength of the metal material having the lowest shear strength among the metal materials composing the dissimilar metal joint.

[4] The dissimilar metal joint described in any of [1] to [3] above, wherein the layer thickness of the dissimilar metal joint is 3 mm or more.

[5] The dissimilar metal joint described in any of [1] to [4] above, wherein the dissimilar metal joint can be cut, machined or bent to a shape suitable for the shape of the transport equipment structure.

[6] A transport equipment structure provided with the dissimilar metal joint described in any of [1] to [5] above.

[7] A method for producing the dissimilar metal joint described in any of [1] to [5] above, including a step for carrying out joining by colliding flame-retardant magnesium with a metal or alloy selected from the group consisting of aluminum alloy, titanium alloy, stainless steel and steel at high speed by utilizing explosive gas, laser or electricity/electromagnetism.

Advantageous Effects of Invention

An object of the present invention is to provide a novel dissimilar metal joint that contains a flame-retardant magnesium alloy layer and can be used in a transport equipment structure.

DESCRIPTION OF EMBODIMENTS

The following provides a detailed explanation of embodiments of the present invention.

A first embodiment is a dissimilar metal joint for a transport equipment structure in which two or more layers of different types of metal materials are joined, wherein, at least one layer of the two or more layers of metal materials is composed of a flame-retardant magnesium alloy, another layer is composed of a metal or alloy selected from the group consisting of aluminum alloy, titanium alloy, stainless steel and steel, and the two or more layers of different types of metal materials are mutually joined over the entire surface of joining surfaces that respectively overlap.

In the present description, "flame-retardant magnesium alloy (or magnesium alloy having flame retardation)" refers to magnesium alloy that has been alloyed for the purpose of increasing ignition temperature. Although the ignition temperature of ordinary, general-purpose magnesium alloy (specific examples of which include AZ31, AZ61 and AZ91) is roughly 500° C. to 600° C., any magnesium alloy having an ignition temperature higher than this may be referred to as flame-retardant magnesium alloy. A flame-retardant magnesium alloy (or magnesium alloy having flame retardation) preferably has an ignition temperature that is 100 K or more higher (600° C. or higher), more preferably 150 K or more higher (650° C. or higher), and even more preferably 200 K or more higher (700° C.) than general-purpose magnesium alloy. The ignition temperature of flame-retardant magnesium alloy is preferably higher than the melting point thereof. If it is necessary to measure the ignition temperature of an alloy for which the ignition temperature is unknown, ignition temperature can be confirmed by differential thermal analysis (DTA).

The flame retardation of numerous flame-retardant magnesium alloys is improved by addition of Ca. Although flame retardation improves as the added amount of Ca is increased, metal malleability conversely tends to decrease. Consequently, Ca content is preferably 0.2% by weight to 3.0% by weight, more preferably 0.3% by weight to 2.0% by weight, and even more preferably 0.4% by weight to 1.5% by weight. Ca content can be confirmed by fluorescent X-ray analysis.

An example of flame-retardant magnesium is an AZX-based alloy in which Ca has been added to an Mg—Al alloy, and specific examples thereof include AZX611 and AZX911. These materials have ignition temperatures that are 200 K to 300 K higher than general-purpose magnesium alloy, and can be used particularly preferably in the present embodiment. Other examples of flame-retardant magnesium alloys include those to which a rare earth metal or other rare metal has been added and magnesium alloys having a LPSO phase structure.

A "flame-retardant magnesium alloy" can be applied to transport equipment as a result of having flame retardation while also significantly contributing to reductions in weight of that equipment, and can be expected to result in damping of transport equipment structures due to one of the characteristics of magnesium in the form of vibration absorption.

In the present description, a "dissimilar metal joint" refers to a joining member used when joining different types of metals. The dissimilar metal joint is preferably a cladding material in which two or more different types of metals are joined. A dissimilar metal joint containing a flame-retardant magnesium alloy layer is used for the purpose of reducing joint weight and facilitating joining. Although there are no particular limitations on the method used to join the metals, a method such as friction welding, roll pressure welding, friction stir welding diffusion bonding, explosive welding or other solid phase bonding is desirable from the viewpoint of joining strength.

Figure 2:
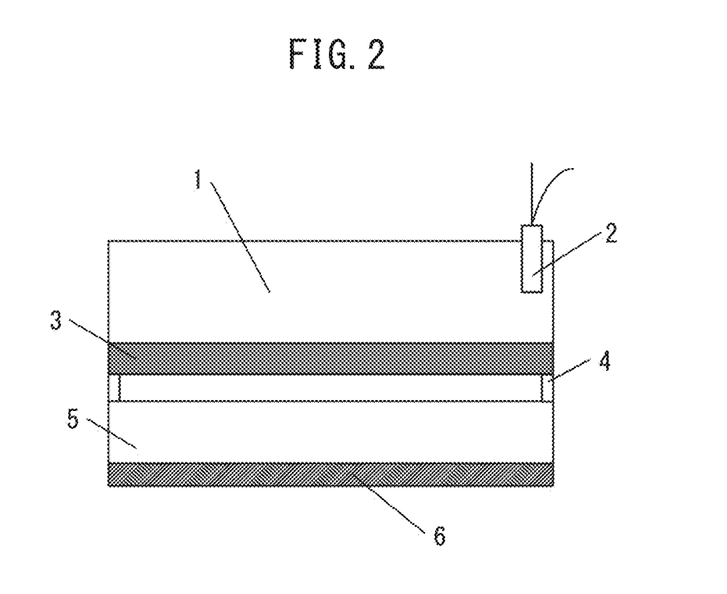
FIG. 2 is a schematic diagram of explosive welding.
Figure 3A:
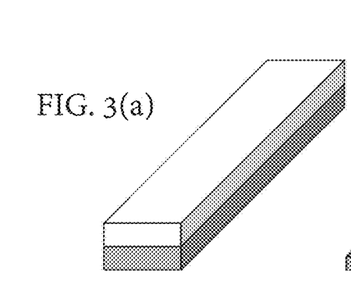
FIGS. 3(a) to 3(g) indicate examples of forms of the dissimilar metal joint of the present embodiment.
Figure 3B:
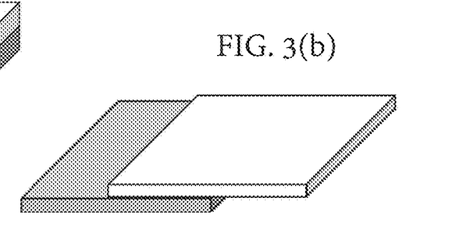
Figure 3C:
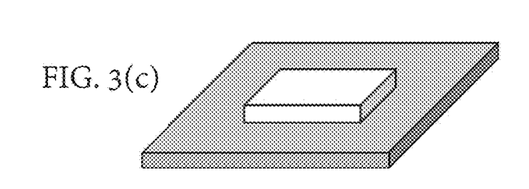
Figure 3D:
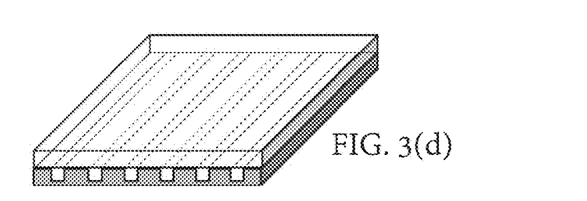
Figure 3E:
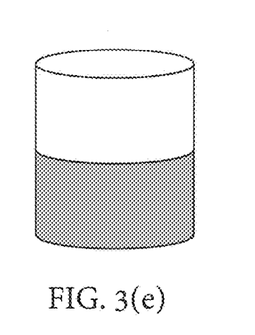
Figure 3F:
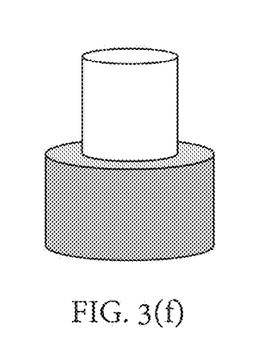
Figure 3G:
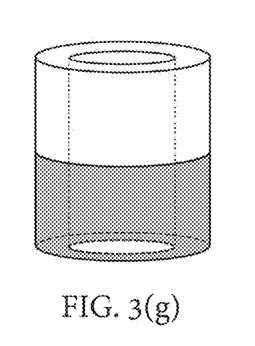
Figure 4:
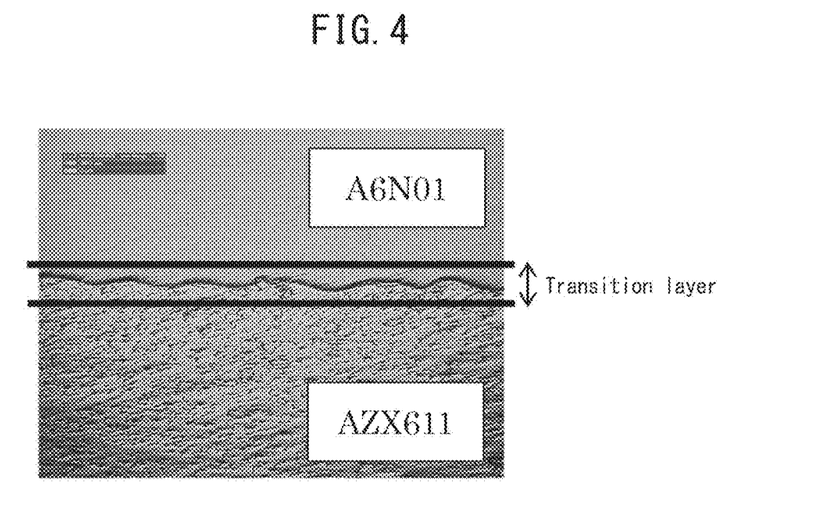
FIG. 4 depicts an image of the joining interface of the dissimilar metal joint of Example 1.
Figure 5:
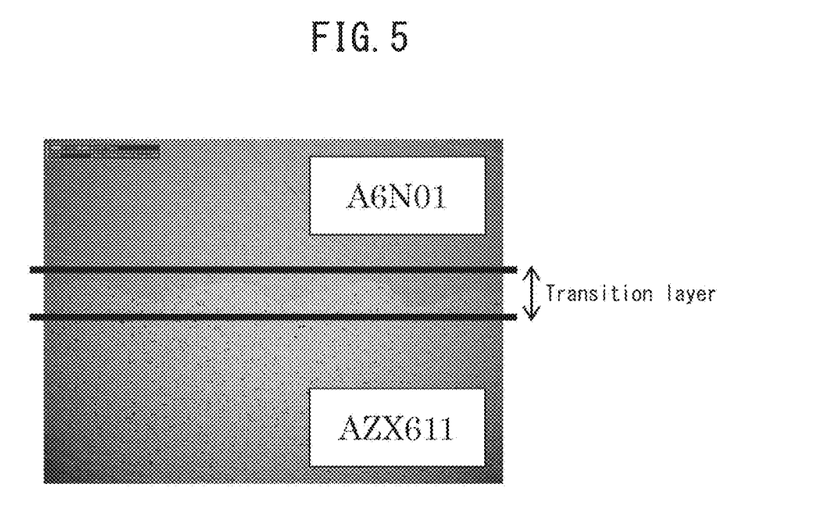
FIG. 5 depicts an image of the joining interface of the dissimilar metal joint of Example 2.
Figure 6:
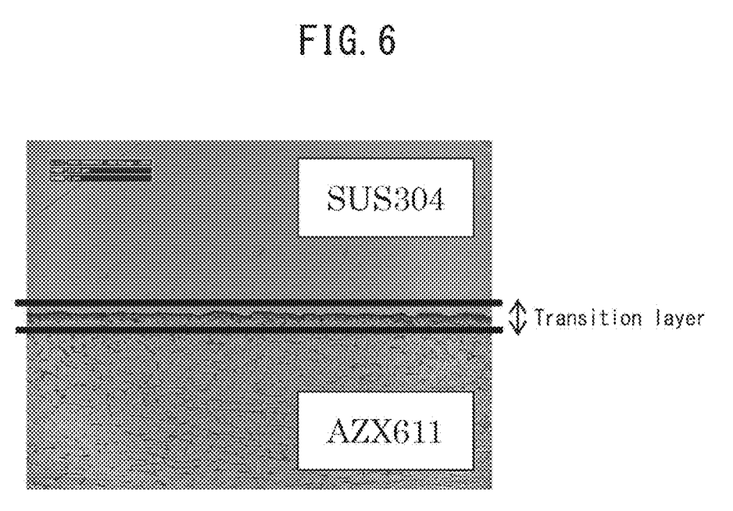
FIG. 6 depicts an image of the joining interface of the dissimilar metal joint of Example 3.
Figure 7:
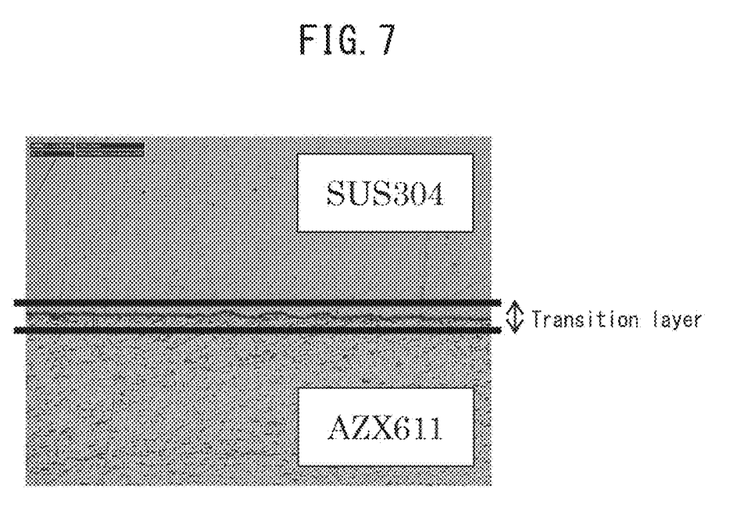
FIG. 7 depicts an image of the joining interface of the dissimilar metal joint of Example 4.
Figure 8:
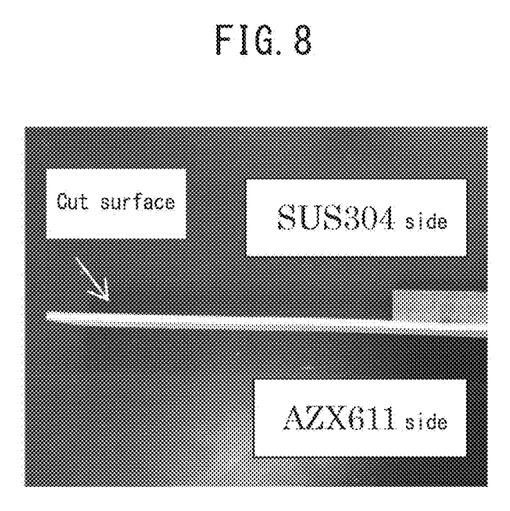
FIG. 8 depicts an image of a f testing of the joining interface after cutting the dissimilar metal joint of Example 5.

In the present description, "explosive welding" refers to a method using a device such as shown in FIG. 2 for joining metals separated at a fixed interval (cladding material (3) and base material (5)) by supports (4) using the high pressure of an explosive (1), and is a technique enabling the rigid joining of different types of metals in particular. A major characteristic of this technique is that, since joining can be carried out without subjecting the metal material to hardly any load in the form of heat, rigid joining can be achieved even when combining metals that cannot be joined by ordinary methods. Moreover, the mechanism behind this rigid joining is known to involve the joining interface of the metals joined by explosive welding exhibiting a unique wavy interface, and the rigid binding is said to be attributable to the joining area larger than the linear joining interface.

The explosive (1) refers to a type of explosive that generates a detonation wave due to the action of a detonator (2). An explosive having a detonation velocity of 1,000 m/sec or more is preferably used to rigidly join metal plates, and an explosive having a detonation velocity of 1,500 m/sec to 3,000 m/sec equal to ⅓ to ½ the speed of sound is preferably used for obtaining more optimum joining strength.

Specific examples of explosives include PETN (pentaerythritol tetranitrates) of ammonium nitrate and ester nitrates, trinitrotoluene (TNT) of nitroglycerin and nitro compounds, cyclotrimethylene trinitramine and cyclotetramethylene tetranitramine. These may be used alone or as a mixture with other explosive components or components other than explosives.

On the other hand, when it comes to joining other than explosive welding although linear joining or partial joining of overlapping plate materials has been proposed for friction stir welding between flame-retardant magnesium and a different type of metal, for example, this technique has problems such as the bonding range being dependent on tool size, difficulty of full-surface joining on the surface, suitable joining conditions for each material, difficulty in achieving defect-free, rigid joining when joining different types of metals, or difficulty in joining materials having a large difference in plate thickness.

In addition, in the case of fabricating a dissimilar metal joint by joining flame-retardant magnesium alloy with another different type of metal using conventional explosive welding cracks end up forming due the collision during joining thereby preventing the obtaining of a sound joined body due to the low elongation at normal temperatures attributable to the crystal structure of magnesium, and further decreases in the value of elongation due to the effects of elements added to impart flame retardation. Moreover, even if partial joining is possible, due to the formation of a transition layer measuring 300 μm or more, the formation of a brittle intermetallic compound and strong plastic flow, cracking and separation occur such that, in terms of joining strength as well, shear strength equal to 70% of the shear strength of the weakest material among the metal materials composing the dissimilar metal joint cannot be realized.

According to the explosive welding method as recently discovered by the inventors of the present invention, flame-retardant magnesium alloy is joined by suppressing deformation of the refractory magnesium alloy during joining more than elongation of the material so that cracks do not form in the flame-retardant magnesium alloy. Examples of a method for suppressing deformation of the flame-retardant magnesium alloy include using a deformation suppression device, carrying out joining by heating the material, or reducing the energy during joining using a cushioning material for an underlay.

As the method using a deformation suppression device, a method consisting of surrounding the joining materials with a high-strength frame material to suppress deformation is effective. Although there are no particular limitations on the material used for the frame material provided it is able to withstand the shock during explosive welding examples thereof include pure titanium, titanium alloy, pure iron, carbon steel, SUS, pure Ni, Ni-based alloy, pure copper, copper alloy, pure Zr, Zr alloy, Ta, Mo, Nb and W. Pure iron, carbon steel and SUS are the most easily available and demonstrate high strength as frame materials, thereby making them preferable.

The thickness of the frame material is preferably 1 mm or more. Although the greater the thickness the better the strength, which is effective for suppressing deformation of the flame-retardant magnesium alloy, the thickness is realistically 20 mm or less.

There are no particular limitations on the method used to attach the frame material to the materials being joined and a known method can be used. Caution is required so that there are no gaps between the frame material and the materials being joined. Most preferably, the materials to be joined are fit into the frame material while precisely matching the dimensions of both. Although the frame material can be fixed in position using a metal adhesive or adhesive tape in cases in which it is difficult to precisely match dimensions, in cases in which strength of the joint is inadequate, the frame material to be joined may be welded. The joined frame material can be removed by cutting away following explosive welding.

In the case of heating the material, the elongation value of the material is improved resulting in greater resistance to cracking during joining by heating the material to about 200° C. It is important to maintain the entire surface at a uniform temperature and a heat source capable of uniformly providing heat over a wide area is used preferably. The simplest, preferable method consists of placing a thick metal plate on a temperature-controllable heat source such as an electric heating coil followed by further placing the material to be joined thereon and heating. Although there are no particular limitations on the heating rate, for safety reasons, the heating rate is preferably about 1° C./min to 50° C./min. Since the material reaches a high temperature, it is necessary to select explosive that is stable even at 200° C. so that the explosive is not decomposed or ignited by the heat at the time of explosive welding.

In the case of using a cushioning material for the underlay, a low-density material, material having a high elastic modulus, material having high porosity, or brittle material and the like can be used for the cushioning material. Specific examples of low-density materials include Styrofoam, urethane foam and polyethylene foam. Examples of materials having a high elastic modulus include hard rubber and metal spring. Examples of materials having high porosity include industrial articles such as cardboard, honeycomb ceramic or Rashchig ring. Examples of brittle materials include ceramics, concrete, wood, plastic and glass.

Impacts during joining can be alleviated and cracking of the flame-retardant magnesium alloy can be prevented by placing the aforementioned cushioning material under the base material as an underlay and suitably setting the impact speed of the plates.

In the present description, an "underlay" refers to a material as shown in FIG. 2 with reference symbol (6) that is normally used for the purpose of suppressing material deformation and preventing the occurrence of damage when joining metals by explosive welding.

According to this novel method for explosive welding of a flame-retardant magnesium alloy, it is possible to produce a dissimilar metal joint having a total thickness of 3 mm or more regardless of the composite plate thickness ratio of each material, and contributes to the design of a joint material that adequately satisfies requirements for light weight and strength suitable for the site where used even in the case of a structure of transport equipment. Moreover, as a result of the total thickness of a joint of the dissimilar metal joint being 3 mm or more, decreases in joining strength caused by welding heat can be prevented when welding a metal material and the same type of metal material that compose the dissimilar metal joint.

In the present embodiment, the flame-retardant magnesium alloy layer and other metal layer are preferably joined directly. In the present description, "joined directly" refers to the flame-retardant magnesium alloy layer and other metal layer being joined without having an adhesive layer or intermetallic compound layer and the like interposed therebetween. The dissimilar metal joint of the present embodiment demonstrates high joint strength due to the flame-retardant magnesium alloy layer and other metal layer being joined directly.

An "intermetallic compound" as referred to here is a type of alloy formed as a result of different types of metals being mutually put into solid solution at the joining interface. For example, in the case the base materials being joined are a flame-retardant magnesium alloy and an aluminum alloy, an intermetallic compound consisting of magnesium and aluminum is mainly formed at the joining interface thereof. If the intermetallic compound is present to a degree that is locally interspersed at the joining interface, there is no particular effect on the strength of the multimaterial joint. However, in the case the intermetallic compound is widely distributed in the form of a continuous "layer", it can become a factor that lowers joint strength. The presence or absence of an intermetallic compound layer can be determined by elemental analysis by carrying out EDS on the joining interface. Furthermore, since a "transition layer" to be subsequently described refers to a portion where the base material has become deformed due to the effects of plastic flow and heat, the nature thereof differs from that of an intermetallic compound layer, and the presence of absence of an intermetallic compound layer is determined separately from the presence or absence of a transition layer.

In the present description, the phrase "mutually joined over the entire surface of joining surfaces that respectively overlap" refers to defining the surfaces corresponding to the surfaces having a large cross-sectional area of two plate materials prior to explosive welding that compose a dissimilar metal joint as joining surfaces, and joining over the entire surface at that portion where the joining surfaces of the plate materials make contact while overlapping. Examples of the form of the dissimilar metal joint include each of the types of forms of (a) to (g) indicated in FIG. 3. Furthermore, FIG. 3 indicates one example of embodiments of the joint material of the present invention, and joint materials composed of three or more layers are also included in embodiments of the present invention.

Figure 1:
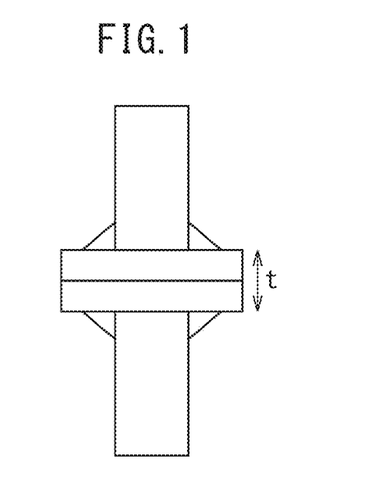
FIG. 1 is a schematic diagram showing one example of a dissimilar metal joint of the present embodiment. In the diagram, t indicates the total thickness of the joint.

In the present description, the "total thickness" of a joint indicates the thickness in the direction perpendicular to the surface where the two types of materials that compose the dissimilar metal joint are joined as indicated with reference symbol "t" in FIG. 1.

In the present description, "joined over the entire surface" refers to a state in which there is no portion of the dissimilar metal joint judged to be a non-joined portion according to an ultrasonic examination and the flaw indication pattern of the joining interface is within standards in a penetrant testing of a lateral surface of the dissimilar metal joint. The above two tests will be subsequently explained.

In the present description, "transition layer" refers to a deformation layer between materials to be joined that is formed due to plastic flow and/or heat. For example, as shown in FIGS. 4 to 7, a transition layer is the portion where the structure of a metal base material prior to joining is periodically deformed in a wavy shape due to the effects of plastic flow or heat and the like.

Figure 9:
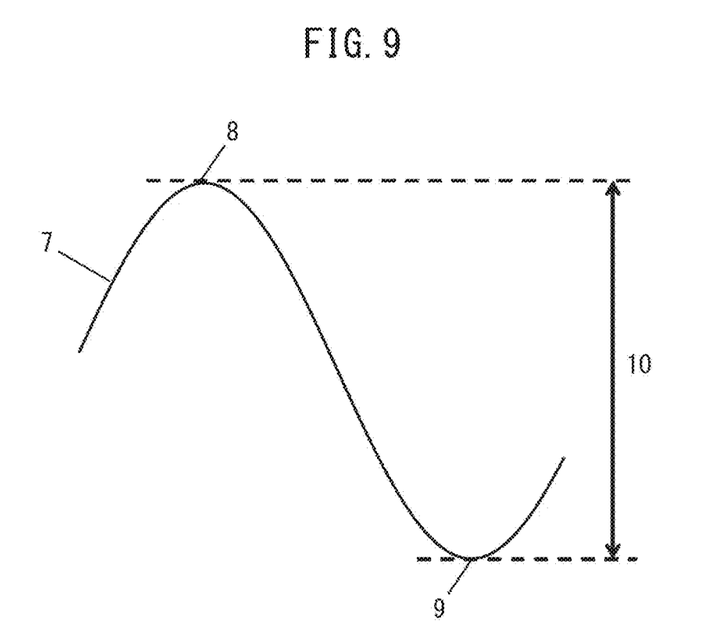
FIG. 9 explains the thickness of a transition layer.

In the present description, "thickness of the transition layer" refers to the average value determined by measuring wave height at 10 arbitrary locations on the joining interface along the outer peripheral surface of a joint material. Wave height refers to the difference in height between the peak and the trough of a wave as shown in FIG. 9. Wave height is measured using an electron microscope in the following examples.

Furthermore, although only two lines are shown in FIGS. 4 to 7, these two lines illustrate the approximate location of the transition layer. Although added to prevent misunderstanding, the interval between these two lines does not indicate the thickness of the transition layer.

An ultrasonic examination is carried out to assess a non-joined portion by determining the presence or absence of a reflection echo at a joining interface according to the bottom echo method in compliance with JIS Z 2344 or similar standards. More specifically, a location where the magnitude of a bottom echo is equal to or less than ½ that of a sound portion is judged to be a non-joined portion.

A penetrant testing is carried out using a caliper or other measuring instrument by measuring the size and number of red indication patterns detected according to JIS Z 2343-1-II Cd-2 or comparable standard. More specifically, an indication pattern refers to a red pattern exhibited by a flaw present on a material surface when visually observed with a penetrant used in the penetrant testing. In the subject example, the size and number of detected indication patterns were measured using a caliper. In the present description, among each of the indication patterns, an indication pattern for which the length of a single indication pattern is 1 mm or more, or an indication pattern for which the mutual distance between indication patterns in a continuous indication pattern is 2 mm or less, is defined as being defective.

In the present description, "shear strength" refers to the value obtained on the basis of the shear test defined in JIS G0601. In the present embodiment, the shear strength of a joining interface is preferably 70% or more of the shear strength of the metal material having the lowest shear strength among the materials composing the dissimilar metal joint. In the case of the shear strength of a thin plate material for which it is difficult to determine shear strength, the value obtained by dividing material tensile strength by √3 in accordance with von Mises yield criterion is taken to be the shear strength of the material.

In the present description, the phrase "can be cut, machined or bent" refers to maintaining the aforementioned shear strength without causing the formation of separation, cracks or other defects at the joint of metal materials when subjecting the dissimilar metal joint of the present embodiment to processing.

EXAMPLES

Although the following provides a detailed explanation of the present invention based on examples thereof, the present invention is not limited thereto.

Example 1

A dissimilar metal joint was obtained by joining plate-shaped flame-retardant magnesium alloy AZX611 and aluminum alloy A6N01-T5 by explosive welding. A ceramic material was used for the underlay. The thickness of each plate was 10 mm for AZX611 and 4 mm for A6N01-T5, joining was able to be confirmed to be favorable since cracks and separation had not formed at the joining interface even when observed with an optical microscope and as a result of an ultrasonic examination the plates were joined over their entire surface. The thickness of the transition layer was 72 μm and shear strength of the joining interface was 141 N/mm² (83%).

Example 2

A dissimilar metal joint was obtained by joining plate-shaped flame-retardant magnesium alloy AZX611 and aluminum alloy A6N01-T5 by explosive welding. A ceramic material was used for the underlay. The thickness of each plate was 4 mm for AZX611 and 4 mm for A6N01-T5, joining was able to be confirmed to be favorable since cracks and separation had not formed at the joining interface even when observed with an optical microscope and as a result of an ultrasonic examination the plates were joined over their entire surface. The thickness of the transition layer was 79.3 μm and shear strength of the joining interface was 147 N/mm² (88%).

Example 3

A dissimilar metal joint was obtained by joining plate-shaped flame-retardant magnesium alloy AZX611 and stainless steel SUS304 by explosive welding. A resin sheet was used for the underlay. The thickness of each plate was 4 mm for AZX611 and 1.5 mm for SUS304, joining was able to be confirmed to be favorable since cracks and separation had not formed at the joining interface even when observed with an optical microscope and as a result of an ultrasonic examination the plates were joined over their entire surface. The thickness of the transition layer was 24 μm and shear strength of the joining interface was 125 N/mm² (75%).

Example 4

A dissimilar metal joint was obtained by joining plate-shaped flame-retardant magnesium alloy AZX611 and stainless steel SUS304 by explosive welding. Styrofoam was used for the underlay. The thickness of each plate was 4 mm for AZX611 and 2 mm for SUS304, joining was able to be confirmed to be favorable since cracks and separation had not formed at the joining interface even when observed with an optical microscope and as a result of an ultrasonic examination, the plates were joined over their entire surface. The thickness of the transition layer was 27.5 μm and shear strength of the joining interface was 192 N/mm² (115%).

Example 5

The joined body obtained in Example 4 was cut into an arbitrary shape followed by carrying out a penetrant testing on the resulting cross-section in order to confirm joined status. As a result of the test, defects such as separation or cracking did not occur in the cross-section after cutting and joined status was sound.

Comparative Example 1

Flame-retardant magnesium alloy AZX611 and aluminum alloy 6061-T651 were joined under the conditions described in the aforementioned PTL4 (Japanese Unexamined Patent Publication No. 2007-15018). As a result thereof, cracking and damage attributable to deformation of the flame-retardant magnesium alloy occurred at numerous locations and separation occurred at the origins of the separation and damage.

INDUSTRIAL APPLICABILITY

The dissimilar metal joint containing a flame-retardant magnesium alloy layer of the present invention enables highly reliable joining of metals of the same type at a joint of a different type of metal material of a transport equipment structure, thereby enabling it to be used favorably as a joint of a transport equipment structure.

REFERENCE SIGNS LIST

T Total thickness of joint
1 Explosive
2 Detonator
3 Cladding material
4 Support
5 Base material
6 Underlay
7 Wavy joining interface
8 Wave peak
9 Wave trough
10 Wave height

The invention claimed is:
1. A dissimilar metal joint comprising:
two or more layers of different types of metal materials that are joined by explosive welding at joining surfaces, wherein at least one layer of the two or more layers of metal materials is composed of a flame-retardant magnesium alloy having an ignition temperature of 650° C. or higher, another layer of the two or more layers is composed of a metal or alloy selected from a group consisting of aluminum alloy, titanium alloy, stainless steel and steel, and the two or more layers of metal materials are mutually joined over an entirety of the joining surfaces that respectively overlap,
wherein the metal materials to be joined are fit into a frame to suppress deformation of the flame-retardant magnesium alloy and to improve shear strength at a joining interface, wherein the frame has a thickness of 1 mm or more and 20 mm or less, and wherein a shear strength at the joining interface of the joining surfaces as measured on a basis of a shear test defined in HS G0601 is 70% or more of a shear strength of a metal material having a lowest shear strength among the metal materials composing the dissimilar metal joint.

2. The dissimilar metal joint according to claim 1, wherein the joining surfaces are such that the two or more layers of metal materials are mutually joined directly by solid phase bonding without having an adhesive layer interposed there between, and a thickness of a transition layer formed due to plastic flow and/or heat at the joining interface is 300 μm or less.

3. The dissimilar metal joint according to claim 1, wherein a total thickness of the dissimilar metal joint is 3 mm or more.

4. The dissimilar metal joint according to claim 1, wherein the dissimilar metal joint is cuttable, machinable, or bendable to a shape suitable for a shape of a transport equipment structure.

5. A transport equipment structure comprising the dissimilar metal joint according to claim 1.

6. A method for producing the dissimilar metal joint according to claim 1, comprising: carrying out joining by colliding flame-retardant magnesium with a metal or alloy selected from the group consisting of aluminum alloy, titanium alloy, stainless steel and steel at high speed by utilizing explosive gas.

\* \* \* \* \*